(No Model.)

H. W. LIBBEY.
WATER CHUTE OR FLUME AND WATER BASIN.

No. 419,860. Patented Jan. 21, 1890.

UNITED STATES PATENT OFFICE.

HOSEA W. LIBBEY, OF BOSTON, MASSACHUSETTS.

WATER CHUTE OR FLUME AND WATER-BASIN.

SPECIFICATION forming part of Letters Patent No. 419,860, dated January 21, 1890.

Application filed April 22, 1889. Serial No. 308,079. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Water Chutes or Flumes and Water-Basins, of which the following, taken in connection with the accompanying drawings, is a specification.

The object of my invention is to produce a water chute or flume and water-basin for pleasure purposes, and is particularly adapted for halls, rinks, and summer resorts.

The invention consists in constructing a trough in a spiral or other form and terminating in a basin or reservoir filled with water, and in means for conveying water from the basin or reservoir to the top of the trough, so as to keep it supplied with water, all as hereinafter fully described, and pointed out in the claims.

Figure 1:
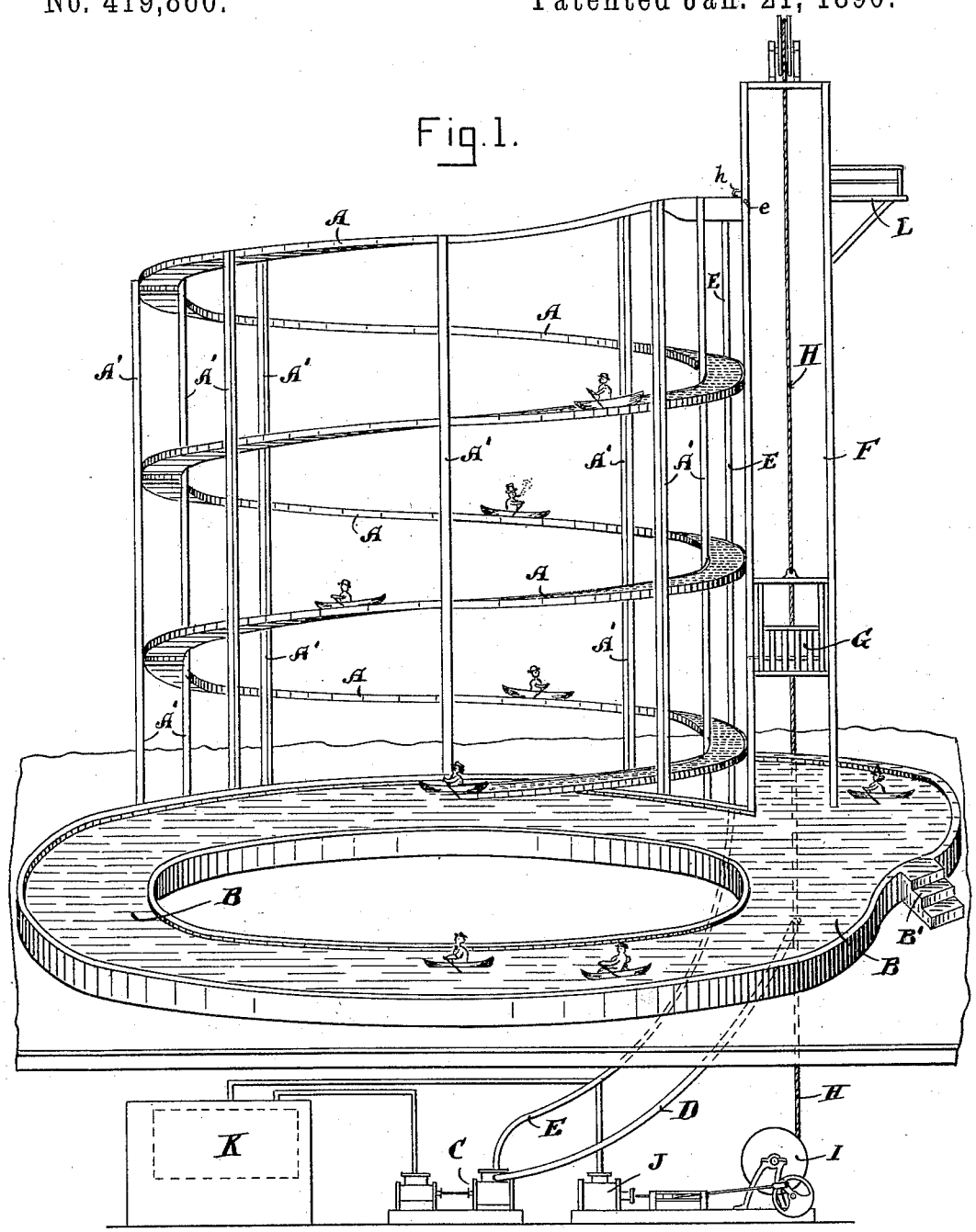
Figure 2:
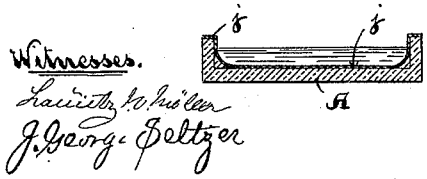
Figure 3:
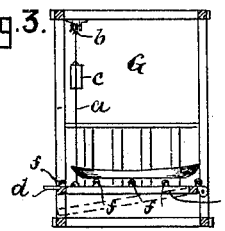
Figure 4:
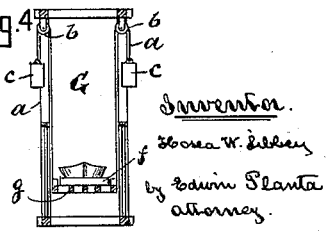

Referring to the accompanying drawings, Figure 1 represents a water chute or flume and water-basin embodying my invention. Fig. 2 is a cross-section through the trough. Fig. 3 is a longitudinal vertical section through the elevator-car, and Fig. 4 is a transverse vertical section through the same.

A represents a trough of spiral form supported by standards A', and B a basin or reservoir.

C is a pump, connected by a pipe D to the lower part of the basin or reservoir and by a pipe E to the upper part of the trough, so that when the pump is in operation the water is drawn from the basin and forced to the top of the trough, through which it flows and again enters the basin. Thus the basin has only to be filled once, the water being used over and over again; but of course a small amount of fresh water will have to be added occasionally to compensate for any loss that may arise from evaporation or other causes.

F represents an elevator, and G the elevator-car.

H is the hoisting-rope that is wound upon the drum I, operated from the engine J.

K is a boiler, from which steam is taken to operate the engine J and pump C.

The engine pump and boiler for the elevator may, when the water chute or flume and water-basin is erected in a hall or rink, be on the floor below the same, as shown; but when erected in the open air they may be by the side of the water-basin.

The bottom $g$ of the car G consists of a platform of open-work or slats, so that there will be little resistance when the car is lowered into the basin. This bottom is hinged at its rear end to the frame of the car, and its front end is supported by ropes $a$, passing over pulleys $b$ on the upper portion of the car, and to the ends of the ropes $a$ are secured weights $c$, which are sufficiently heavy to sustain the weight of the bottom $g$, a boat, and its occupant. In front of the bottom $g$ are provided a bolt or bolts $d$, preferably one on each side, which, when the car is drawn up to the required height, come into contact with a bolt or bolts $e$ on the elevator-frame, and as the elevator continues to ascend, the front end being held by the bolts, the bottom is caused to assume an incline, as shown in dotted lines in Fig. 3, when the boat will slide off into the upper end of the trough A.

I prefer to fit the bottom of the car with rollers $f$, as shown, so as to aid the boat in running off, and I also prefer to place a roller $h$ at the upper end of the trough, as shown. I prefer to make the trough A of wood and line it with any suitable sheet metal or material $j$.

If desired, a platform L may be arranged at the top of the elevator for an attendant to see that the boats are started all right.

When a person desires to enter a boat, he ascends by the steps B'. He then rows or is drawn around to the elevator and carried to the top of the water chute or flume and sails gently down the same into the water-basin, in which he can row about or to the elevator, when he is again carried up. The water-basin is sufficiently wide to allow of two persons passing each other while rowing, so that when desired it can be used for racing purposes.

In the drawings I have shown the water chute or flume arranged on one side of the water-basin, but it may be directly over it; and, instead of a spiral, a zigzag or other form may be employed, and it may be supported in any convenient manner, and in places where there is a suitable supply of water the water may be admitted at the top of the water chute or flume and the superfluous water be carried off from the basin by an overflow-pipe. In such cases the pump C would be dispensed with.

What I claim as my invention is—

1. A water chute or flume and water-basin consisting of the trough A and reservoir B, substantially as and for the purposes set forth.

2. A water chute or flume and water-basin consisting of the trough A and reservoir B, in combination with suitable apparatus for conveying the water from the reservoir to the top of the trough, substantially as set forth.

3. The combination of the trough A and water basin or reservoir with the pump C and pipes D E, arranged substantially as and for the purposes set forth.

4. The trough A, reservoir B, and suitable apparatus for raising the water from the reservoir to the top of the trough, in combination with an elevator, substantially as set forth.

5. The combination, with the trough A and water-basin B, of an elevator and car, the bottom of which is adapted to be tilted when drawn to the desired height, substantially as shown, and for the purposes described.

6. An elevator-car G, having a bottom $g$ hinged at its rear end and supported at its front end by ropes $a$, passing over pulleys $b$, and weights $c$, in combination with the trough A and water-basin B, substantially as shown and described.

In testimony whereof I have signed my name to this specification, in the presence of two subscribing witnesses, on this 2d day of March, A. D. 1889.

HOSEA W. LIBBEY.

Witnesses:
  CHAS. STEERE,
  EDWIN PLANTA.